United States Patent [19]

Howe

[11] Patent Number: 5,183,197
[45] Date of Patent: Feb. 2, 1993

[54] BUNDLE AND PLACE METHOD FOR THE MANUFACTURE OF BRUSH SEALS

[75] Inventor: Harold Howe, Orlando, Fla.

[73] Assignee: Technetics Corp., Deland, Fla.

[21] Appl. No.: 741,768

[22] Filed: Aug. 7, 1991

[51] Int. Cl.⁵ .............................................. B21D 39/00
[52] U.S. Cl. .................. 228/160; 228/173.5; 277/53; 300/21
[58] Field of Search ...... 29/888.3, 417, 423, 29/DIG. 48, 411; 300/21; 277/53; 228/155, 175, 173.5, 185, 160

[56] References Cited

U.S. PATENT DOCUMENTS

| Re. 30,206 | 2/1980 | Ferguson | 228/160 |
| 4,204,629 | 5/1980 | Bridges | 277/53 |
| 4,274,575 | 6/1981 | Flower | 277/53 |
| 4,678,113 | 7/1987 | Bridges | 228/160 |
| 4,821,390 | 4/1989 | Seylor | 29/417 |
| 5,083,840 | 1/1992 | Young | 300/21 |
| 5,108,155 | 4/1992 | Hettes | 264/243 |

FOREIGN PATENT DOCUMENTS 1462272 9/1965 France ................................. 300/21

Primary Examiner—Richard K. Seidel
Assistant Examiner—James Miner
Attorney, Agent, or Firm—Art Greif

[57] ABSTRACT

A method for the production of brush seals, by first forming a linear array of contiguous, parallely aligned brush elements. The elements, each containing a multitude of bristles, are aligned in a resilient, linear support, in which the long axis of the bristles are parallel to each other. The resultant, resiliently supported array of brush elements is easily contoured to various arcuate shapes. For effecting a seal between the rotating elements of a turbine engine, the linear array is contoured in the form of a circular array, in which the free ends of the bristles in the array are joined to an annular backing ring.

10 Claims, 2 Drawing Sheets

BUNDLE AND PLACE METHOD FOR THE MANUFACTURE OF BRUSH SEALS

TECHNICAL FIELD

This invention relates to a method for the manufacture of brush seals by forming bundles composed of many fine bristles and a method for achieving the requisite alignment of the bundles within plate members which provide the rigid backing of the brush seal.

BACKGROUND

The use of brush elements to effect a seal between rotating members dates back to the early part of this century; for example, see U.S. Pat. No. 885,032. Although various methods are available for the production of brushes, two basic methods are now generally employed in the production of brush seals for rotating elements—particularly as such seals are employed in turbo-machinery. The first such method can be described as the "bundle and place" method, and is exemplified by the varying techniques shown in U.S. Pat. Nos. 2,672,640; R.E. 30,206; 4,274,575 and 4,678,113. The differing procedures shown in these patents have two elements in common, they: (i) first form a bundle composed of a multitude of bristles by employing some method of holding the bristles substantially parallel to each other, and thereafter (ii) employ a procedure for placing the bundle onto an annular backing member and joining the bundles to the backing member, to make up the seal. The other well-known method employs a winding machine to rapidly wind the wire onto a mandrel; wherein (i) the mandrel itself may be the backing member which will form the brush seal, i.e., as shown in U.S. Pat. Nos. 4,204,629, 4,642,867 and 4,732,339, or (ii) the wound mandrel is used to hold the multitude of bristles for subsequent placement onto the annular backing ring, as shown in U.S. Pat. No. 4,730,876.

The winding procedures appear to offer significant advantages because of their suitability to rapid production and automation. However, they have proven unsuitable in the production of small diameter brush seals because long lengths of wound bristles are unsuitable to achieving the required bristle inclination relative to the backing member. Thus, the bundle and place method is essentially mandated in the production of small diameter (e.g., 7 to 15 cm) brush seals. Moreover, winding around the backing member dictates that a significant portion of the wrapped wires be scrapped—after cutting. When employed in turbine engines, the strands which form the brush are normally expensive, high temperature, exotic metal alloys or ceramics—such that the scrapped material adds significantly to the cost of production.

U.S. Pat. No. 4,730,876, the disclosure of which is incorporated herein by reference, describes what may be termed a hybrid of the "winding" and "bundle and place" methods. The procedure shown in this patent first winds the wires around a mandrel. After winding, the portion of the wire wrapped around the mandrel is bound together by a flexible clamping member to form a linear array of juxtaposed, parallelly aligned bristles. The resultant, flexible linear array may then be placed on a backing ring (as shown in FIG. 4 of that patent), in an attempt to provide the benefits (e.g. less scrap, small diameter rings) of the "bundle and place" method. The linear array of bristles produced by the method of this '876 patent is composed of two distinct leaves of bristles, which result from winding the bristles over a mandrel and subsequently forcing the leaves together by the flexible clamping member. Inherent in such a clamping procedure is the diminished ability to maintain the requisite bristle packing density and bristle inclination—both of which are critical for brush seals used to effect requisite sealing between the various stages of a turbine engine. If the clamping member is designed to be of a material and structure rigid enough, both to hold the wound bristles in a "tight-packed" arrangement and to maintain the requisite inclination (e.g. about 73° with respect to the mounting member) then the member will inherently be difficult to bend to the desired contour—particularly contours having a small radius of curvature. Conversely, if the member is designed to be comparatively flexible, it will then be difficult to maintain the above-stated objectives of tight-packed bristles, all of which are inclined at the requisite angle.

DISCLOSURE OF INVENTION

It has been found that a linear array which meets the above objectives can be produced by utilizing a multitude of small-width bundles or brush elements to form the array. The bundles are placed on a placement guide so that the joined ends are in abutting relationship—with the strands therein being substantially parallel, but angled (with respect to the placement guide) at the requisite inclination. To form the linear array of contiguous bundles, a resilient connecting member is formed around the abutting, joined ends to form a resiliently supported array of brush elements which can easily be contoured to any desired shape. For example, the resilient array of brush elements can be bent around the outer surface of a cylindrical member whereby the unsupported bristles extend radially outward. Conversely, the resilient array can be bent around the inner surface of a cylindrical member such that the bristles point radially inward. Desirably, the bundles are produced in one operation by forming a long ribbon, composed of a multitude of individual strands, joined together, e.g., by fusing, welding, or brazing, at defined points along the length of the ribbon; such that when the ribbon is cut at each juncture and at the midpoint between each juncture, two bundles are formed for each weldment —each bundle being joined at one end of its length.

MODES FOR CARRYING OUT THE INVENTION

As indicated above, the formation of a flexible linear array relies on the initial production of brush elements or bundles of fine strands. The production of such bundles is shown, for example, in U.S. Pat. No. 2,672,640. However, the method shown in that patent is both costly and cumbersome, since each bundle is produced by first cutting a ribbon and then joining the ribbon at the cut end—a procedure which is, in effect, a batch method. Additionally, that prior art method requires pushing the ribbon of strands through a die—a procedure which can be troublesome when dealing with bundles of very fine strands (e.g., a diameter of 0.05 to 0.1 mm), wherein the requisite bundle width can be as small as 0.8 mm (the requisite width being a function of the radius of curvature to which the bundle array will be bent). Such widths will generally be in the range of 1 to 5.5 mm.

Figure 1:
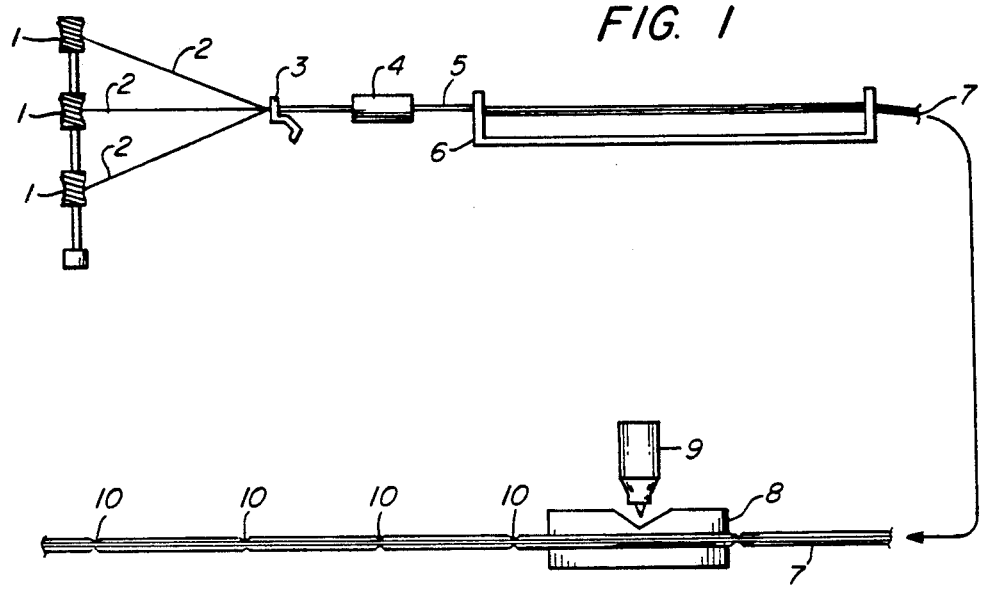
FIG. 1 is a schematic diagram showing the formation of a comparatively long ribbon of individual strands, including the formation of the joined ribbon containing the precursor bundle elements formed by joining the ribbon at defined distances along its length.
Figure 2:
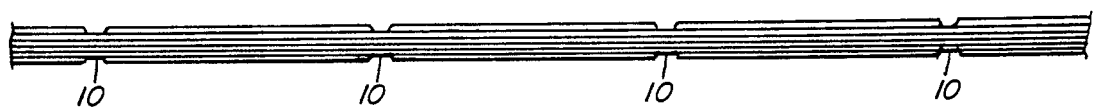
FIG. 2 shows an enlarged view of the joined ribbon, illustrating how approximately two bundles can be produced for each weld.
Figure 3:
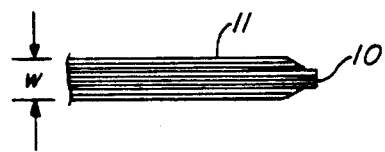
FIG. 3 is a representation of a single bundle produced by cutting the ribbon of FIG. 2.

Although the bundles used in the instant process may be produced by the method of the '640 patent, they are more desirably produced by the method shown in FIGS. 1 and 2. Referring to FIG. 1, several spools 1 of fine wire 2 are fed through a pigtail collector 3 and tensioner 4 to produce an assembly 5 of several strands which is wound around rotatable collector 6 to produce the multi-strand ribbon 7 from which the bundles will be produced. For example, in a production of a ring having a diameter of 30.5 cm, 6 spools of 0.07 mm wire are fed through the tensioner to produce a six strand assembly, which is then wound around the rotatable collector 60 times to produce a 360 strand ribbon, having a width of about 5 mm. The multistrand ribbon from the collector is then fed to the welding station 8 where the wires in the ribbon are fused together by arc welder 9 at defined distances, such that the weld points will be spaced at a distance approximately twice the length of the desired bundle. Utilizing this preferred method, approximately two bundles per weld are produced, as shown in FIG. 2, by cutting the ribbon along each weld and at the midpoints between the welds. A finished bundle 11 having a width W and a restrained end 10 is shown in FIG. 3.

Figure 4:
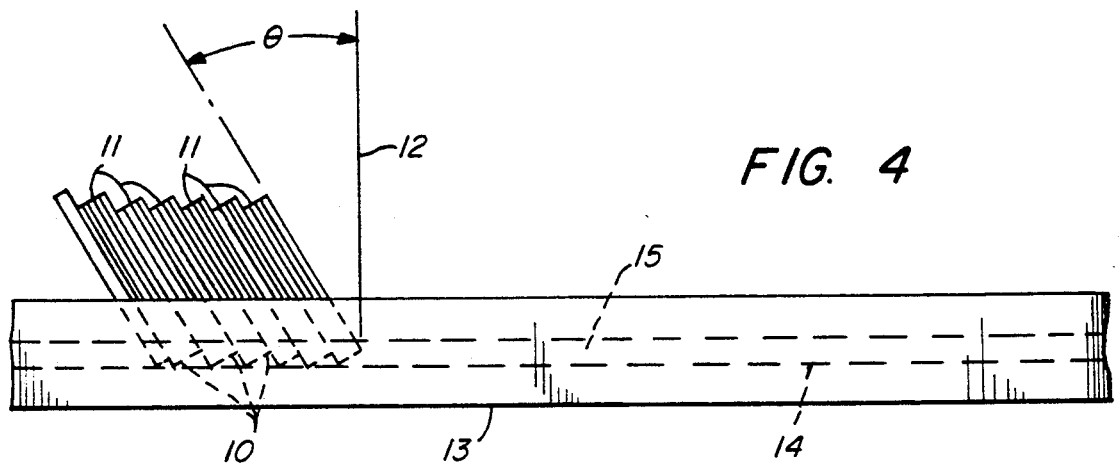
FIG. 4 shows a fixture for the production of a linear array of bundles held together in a flexible binder.
Figure 5:
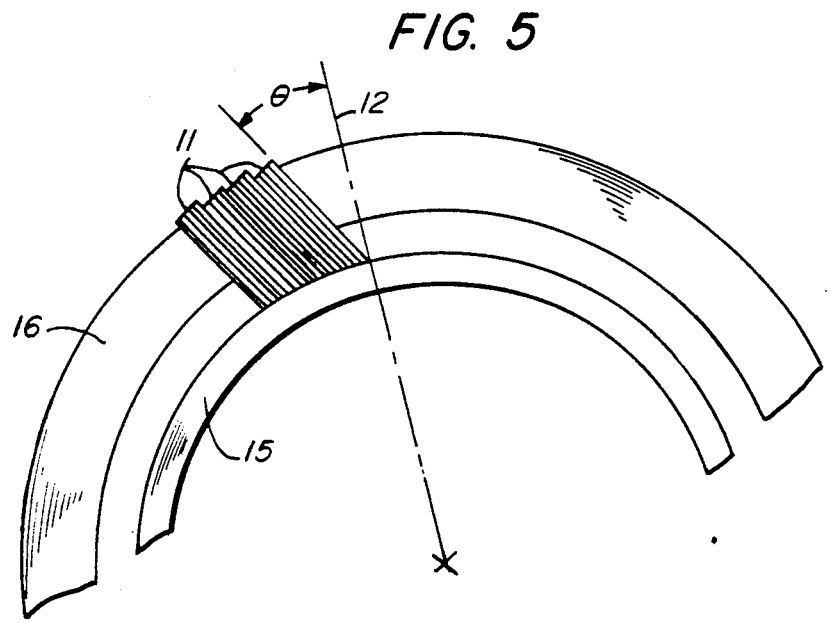
FIG. 5 shows how a contoured linear array is employed to align the bundles onto the ultimate backing member, forming a seal with the bristles extending readily inwardly.
Figure 6:
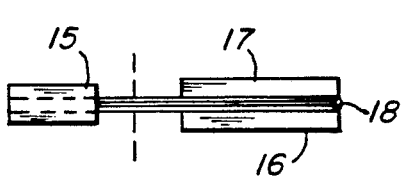
FIG. 6 shows how the arcuate array is applied to a backing plate.

The bundles are placed on a placement guide to aid in obtaining the desired angular orientation Θ of the bristles, with respect to the radial line 12 of the brush seal (FIG. 4). The placement guide 13 may have a trough 14 into which the joined ends 10 of the bundles are placed. The trough is partially filled with a liquid binder 15. Upon curing, the binder forms a flexible connector—adhering the bundles together and maintaining the linear array at the desired inclination angle. After curing, the bound bundles are removed from the placement guide and bent into the desired contour for attachment to the backing plate which will form the holder for the brush seal. The linear array so produced may then be employed to form a brush seal in a manner similar to that shown in U.S. Pat. No. 4,730,876. A round form (not shown) is used to bend the flexible linear array around it, to form an arcuate array with the bristles extending radially outward. Because the unbound ends are not restrained, they can fan out and maintain the requisite inclination with respect to a radial line 12. As shown in FIG. 5, the arcuate array, comprised of bundles 11, maintained in the array by flexible connector 15, is applied to backing plate 16. Referring to FIG. 6, cover plate 17 is placed on top of the backing plate, the two plates are clamped together and the excess bristles (around the outer circumference of the plates) are trimmed off. A weld 18 is then applied to the seals, outer edge to hold the two plates and the wire bristles together. The wire bristles, extending between the plates and the flexible connector 15, are cut (indicated by dashed line) and the cut bristle edges then machined to produce the brush seal.

I claim:

1. In the formation of a flexible linear array of parallelly aligned, contiguous bristles, for use in the production of a brush seal, the improvement which comprises;
   providing a multitude of bundles of tightly packed bristles, the bristles of each such bundle being joined at one end thereof,
   placing the bundles on a member to form a linear brush array, such that the long axes of the bristles in the array are parallel to each other, said member maintaining the bundles in such an array,
   applying a material capable of forming a resilient backing at the joined-end portion of each of the bundles, whereby the backing acts as a flexible connector to maintain the bundles in the form of the linear brush array.

2. The method of claim 1, in which said bundles have a width of 0.8 to 5.5 mm.

3. A method for forming a flexible linear array of parallelly aligned, contiguous bristles, for use in the production of a brush seal, which comprises;
   providing a ribbon of fibers, said ribbon being composed of a multitude of individual strands of fiber,
   at defined distances along the length of the ribbon, joining the individual strands to each other,
   cutting the ribbon at the resultant junctures to form a multitude of bundles, the strands of each such bundle being joined at one end thereof,
   placing the bundles on a member to form a linear brush array, such that the long axis of each bundle in the array is parallel to each other,
   forming a resilient backing, at the joined-end portion of each of the bundles whereby the backing acts as a flexible connector to maintain the bundles in the form of the linear brush array.

4. The method of claim 3 wherein the ribbon is cut at each juncture and at a distance approximately midway between each juncture to form two bundles between each pair of junctures.

5. The method of claim 3 wherein said fibers are composed of a material having a melting point in excess of a 1,000° C.

6. The method of claim 3, wherein said array is employed in the production of a brush seal, which comprises,
   conforming said flexible array to the shape of the sealing edge of a plate member which will form a side plate of the brush seal, said side plate having a sealing edge and a back edge,
   placing the array onto the plate so that the joined ends project a predetermined distance past the sealing edge,
   placing a cover plate over the array to sandwich the bristles therein between the side and cover plates,
   trimming the bristle tips at the joined-end of the array, to form the requisite brush sealing surface, and
   joining the bristles to said side and cover plates, at the back edges thereof, 7. The method of claim 6, wherein said brush seal has an arcuate shape, with a radius of curvature less than 7.5 cm at it back edge.

8. The method of claim 7, wherein said brush seal is in the form of a ring, having an O.D. less than 6 cm.

9. A method for the production of bundles of tightly packed bristles, each such bundle being joined, at least at one end thereof, comprising, providing a ribbon of fibers, said ribbon composed of a multitude of individual strands of fiber, passing said ribbons through a die, shaped to closely pack the fibers, at defined points along the length of the ribbon, joining the individual strands to each other; thereby forming a ribbon with a multitude of juncture bands therein, cutting the ribbon at the resultant junctures and at points approximately midway between the junctures, to provide about twice as many bundles as junctures.

10. The method of claim 9, wherein said fibers have a diameter of 0.05 to 0.1 mm and said bundles have a width of 0.8 to 5.5 mm.

* * * * *